(12) United States Patent
de Azeredo et al.

(10) Patent No.: US 9,815,951 B2
(45) Date of Patent: Nov. 14, 2017

(54) PROCESS FOR PRODUCING MODIFIED POLY(PROPENE), THE MODIFIED POLY(PROPENE) AND THE USE THEREOF, AND THE POLYMER BLEND

(71) Applicant: Braskem S.A., Camaçari (BR)

(72) Inventors: Ana Paula de Azeredo, São Paulo (BR); Marcelo Farah, São Paulo (BR)

(73) Assignee: Braskem S.A., Camacari (BR)

( * ) Notice: Subject to any disclaimer, the term of this patent is extended or adjusted under 35 U.S.C. 154(b) by 45 days.

(21) Appl. No.: 14/913,620

(22) PCT Filed: Aug. 25, 2014

(86) PCT No.: PCT/BR2014/000293
§ 371 (c)(1),
(2) Date: Jun. 6, 2016

(87) PCT Pub. No.: WO2015/024088
PCT Pub. Date: Feb. 26, 2015

(65) Prior Publication Data
US 2016/0355644 A1    Dec. 8, 2016

Related U.S. Application Data

(60) Provisional application No. 61/869,102, filed on Aug. 23, 2013.

(51) Int. Cl.
| | |
|---|---|
| C08J 3/22 | (2006.01) |
| C08K 5/43 | (2006.01) |
| C08L 23/10 | (2006.01) |
| C08F 8/00 | (2006.01) |
| C08K 5/098 | (2006.01) |
| C08L 23/12 | (2006.01) |

(52) U.S. Cl.
CPC ........ *C08J 3/22* (2013.01); *C08F 8/00* (2013.01); *C08K 5/098* (2013.01); *C08K 5/43* (2013.01); *C08L 23/10* (2013.01); *C08L 23/12* (2013.01); *C08F 2810/10* (2013.01); *C08J 2323/12* (2013.01); *C08L 2310/00* (2013.01)

(58) Field of Classification Search
CPC ............... C08J 3/22; C08K 5/098; C08K 5/43
USPC ......... 523/351; 524/168, 394, 398, 399, 400
See application file for complete search history.

(56) References Cited

U.S. PATENT DOCUMENTS

| | | |
|---|---|---|
| 4,916,198 A | 4/1990 | Scheve et al. |
| 5,047,485 A | 9/1991 | DeNicola, Jr. |
| 5,416,169 A | 5/1995 | Saito et al. |
| 6,077,907 A | 6/2000 | Raetzch et al. |
| 6,136,926 A | 10/2000 | Raetzch et al. |
| 6,388,020 B2 | 5/2002 | Raetzch et al. |
| 6,433,109 B1 | 8/2002 | Raetzch et al. |
| 6,649,666 B1 | 11/2003 | Read et al. |
| 7,141,182 B2 | 11/2006 | Walters et al. |
| 7,141,183 B2 | 11/2006 | Hattori et al. |
| 7,247,385 B1 | 7/2007 | Tzoganakis et al. |
| 7,799,841 B2 | 9/2010 | Stadlbauer et al. |
| 2003/0138627 A1 | 7/2003 | Finlayson et al. |
| 2008/0021137 A1 | 1/2008 | Walters et al. |
| 2013/0303642 A1 | 11/2013 | Chen et al. |

FOREIGN PATENT DOCUMENTS

| | | |
|---|---|---|
| EP | 0 384 431 A2 | 8/1990 |
| WO | WO 99/27007 | 6/1999 |
| WO | WO 2008/022804 A1 | 2/2008 |
| WO | WO 2011/086581 A1 | 7/2011 |

*Primary Examiner* — Edward Cain
(74) *Attorney, Agent, or Firm* — Duane Morris LLP

(57) ABSTRACT

The present application refers to a process for the modification of polypropylene, wherein amount, size and configuration of the branches are controlled, the process comprising the steps of (A) preparing a bis(sulphonazide) (BSA) masterbatch by dispersing BSA in polyolefin; (B) adding (i) at least one fatty acid salt with metal cation having valence of $1^+$ to $3^+$; and (ii) the BSA masterbatch prepared in step (A) to the polypropylene to be modified. Said modified polypropylene of the present invention possesses properties suitable for use in foaming, blowing, thermoforming, recoating, film extrusion, BOPP, spinning processes and other processes and applications, and it is also suitable to be in contact with food products.

30 Claims, 8 Drawing Sheets

PROCESS FOR PRODUCING MODIFIED POLY(PROPENE), THE MODIFIED POLY(PROPENE) AND THE USE THEREOF, AND THE POLYMER BLEND

FIELD OF THE INVENTION

The present invention refers to modifications of polypropylene (PP) useful for polypropylene foams, thermoforming processes, flat films, blown films, blowing, spinning, raffia, recoating, BOPP, ISBM, injection, extrusion and other applications.

STATE OF THE ART

Polypropylene (PP) is a widely used resin due to its large range of properties and versatility. One of its intrinsic characteristics is the linearity of its chains.

Linear polypropylenes are products having very low performance when subjected to extensional regime and therefore a number of documents describe PP with branches having a rheological regime suitable for extensional deformation regimes, increasing even more their range of applications.

Among processing types which are known to require most from the products in terms of extensional rheological properties there can be cited foaming process, wherein such properties are also important in other process such as thermoforming, blowing, ISBM (Injection Stretch Blow Molding), tubular film extrusion, flat film extrusion, BOPP (bi-oriented polypropylene), fibers, recoating, which require from the resin lower level of branches.

Due to its chemical nature, PP is a product difficult to modify by a reactive extrusion process or polymerization because it has a strong tendency to beta scission, where the chain is broken and the free radicals are recombined in lower molar mass molecules in the presence of free radicals or because of the absence of a catalyst system supporting multifunctional system. Branching of PP requires that the process occurs at low temperature, below its melting point, which is inconvenient for the majority of processes.

Branching-type control is essential since general PP modification processes may generate highly crosslinked products resulting in undesired gels. Branches can be Y-type or H-type, wherein both may have different rheological properties. In general, H-shaped branches are better than Y-shaped branches because they physically contain two branches per chain instead of one.

Some documents disclose PP modifications with coupling agents which are intended to directly achieve H-configuration. The main drawback of this process is that pre-reaction dispersion control is essential since there is the need to prevent the proximal agents from generating crosslinked products (that is, more than one coupling per chain).

The key to handle rheological properties involves controlling number, length and chain distribution of the branches in the modified products.

The first PP modification process commercially applied was based on irradiation of PP resin with electron beam as described in U.S. Pat. No. 4,916,198 where the material bombarded with electron generates radicals and branches at low temperatures. Great drawbacks of this process are high investment costs of irradiation system, operation costs via electron beams or other irradiation sources, heterogeneity of modified samples and limited production scale.

Peroxide modification processes have also been suggested in EP0384431 and U.S. Pat. No. 5,047,485, wherein peroxide is mixed with PP spheres and they are then maintained in a vessel under N2 atmosphere and at temperatures of up to 100° C. In this case, the process period of time to achieve the specification is elevated and the batches depend on the size of vessel used so that the operation scale is limited and even the reproducibility thereof.

Reactive extrusion processes are also found, such as using highly reactive peroxides, in WO9927007 and U.S. Pat. No. 5,416,169 to promote the reaction at low temperatures immediately in the first extrusion steps. This process-type limitation, even in the presence of comonomers, resides in the fact that this peroxide type has a mixture limited to the polymer spheres, having a significant limit of actuation in the modification.

Other reactive extrusion processes with other peroxides in the presence of co-agents such as dienes, silanes, acrylates, siloxanes, etc., are disclosed, for example, in U.S. Pat. No. 7,247,385, U.S. Pat. No. 6,136,926, WO2011086581, U.S. Pat. No. 6,433,109 and U.S. Pat. No. 6,077,907. However, in these technologies there is a competition between degradation processes (beta scission) and grafting, concomitantly. After grafting, a second reaction should be carried out to obtain branching of the system between the grafted monomers. The complexity of this process type comprising several undesired side reactions renders it disadvantageous compared to other one-step processes. Another possible drawback is that this type of reaction also restricts the production when compared to industrial scale.

U.S. Pat. No. 6,388,020, WO2008022804 and U.S. Pat. No. 7,799,841 teach branched products where the H-configuration is more desired than Y-configuration. Branches are produced by post-reactor modification with peroxides and dienes from metallocene resins as described in these documents. IF ranges indicated for PP resin show that the used process (Borstar®) is clearly restricted to industries having the protection right for said technology, which limits commercialization and development of products by competitors. Widely world known resin production routes (licensed) are more advantageous (from both technical and commercial viewpoints) than the process described above.

An important process by means of which branches can be inserted in PP is carried out using coupling agents wherein an agent binds to PP chains to form connections between two chains and thereby H-type branches are produced. The advantage is to avoid the need for grafting. Nevertheless, by simply mixing coupling agent and PP it does not mean that the process is viable since undesired by-products can be formed in addition to reactions which are difficult to control. In this sense, U.S. Pat. No. 7,141,182, US20030138627, US20080021137 and U.S. Pat. No. 6,649,666 refer to a technology related to the same process in which bis(sulphonazide) (BSA) is used, such as, for example, 4,4'-diphenyl ether bis(sulphonazide). Said technology provides a number of possibilities, from the direct addition up to the use of masterbatch. However, none of these documents teaches the processing control of by-products as the unreacted BSA itself and the produced sulfonamides, nor the crosslinking control which may occur instead of branching and nor the optimization effects by the form of masterbatch preparation and its composition.

U.S. Pat. No. 7,141,183 discloses the preparation of a mixture (molecular melt) to obtain a manageable product due to the explosive character of bis(sulphonazide). It is further mentioned that common polymer additives can be added to this mixture of products, such as, antacids (calcium or zinc stearate), lubricants, etc.

U.S. Pat. No. 6,649,666 refers to the formation of products modified by bis(sulphonazide), also in the masterbatch form, in general. Another difference is that said document discloses a simultaneous modification and foaming process. It should be pointed out that since it refers to a reactive extrusion and because the foaming process has a significant amount of specific additives it is not recommended to mix BSA with other chemical components since undesired reactions may occur, generating process safety problems to the health of the operators and to the environment.

Unlike the state of the art, the process of the present invention is advantageous because due to the fact that it comprises two steps it allows for a more precise control of the process and of its possible instabilities, even the advantage of using less amounts of BSA than those used in the technology taught by U.S. Pat. No. 6,649,666. With regard to the use of masterbatch, U.S. Pat. No. 7,141,182 does not mention or refer to the effect of accelerators on the process optimization, nor even to the control of the branch length and control of by-products generated during the masterbatch. Innovative results, such as improvement in the modification process using BSA through the preparation and BSA masterbatch composition are obtained by the present invention over the processes of U.S. Pat. No. 7,141,182.

US20080021137 apparently describes a conjunction of technologies as disclosed in US20030138627 and U.S. Pat. No. 7,141,182, in which the preparation of the molecular melt and the reaction product with PP is taught, without considering process optimizations, effects of accelerators, control of length of branches, or use of bis(sulphonazides) in the masterbatch form US20130303642 describes the use of BSA in the preparation of foams of polypropylene-alpha olefin copolymers by the addition of BSA to the polymer prior to the coupling reaction, followed by foaming. However, the mixture of several chemical components, such as blowing agent (e.g. azodicarbonamide) increases the chance of occurring lack of control, as formerly mentioned. Contrary to the technology taught by said document, an important factor in the process is the limitation of making a mixture at a temperature at which reaction/decomposition or chemical interaction between the blowing agent and BSA do not occur. Thus, in comparison with this state-of-the-art document, the present invention has the advantage that a more precise reaction control is obtained, in addition to the control of the length of the branch and better final properties, including the modification of polypropylene homopolymer.

In vulcanization technology, the systems are composed of vulcanization agents (sulfur, metal oxides, bifunctional compounds and peroxides) and, if necessary, accelerators, activators, retardants, etc. used to produce the desired vulcanization propertied and the desired vulcanizate properties. In this case, the crosslinking agent is BSA, the initiator being the molecule itself. When using organic accelerators, the use of organic and/or inorganic activators is required so that the accelerator will reach their potential. The most used accelerators are zinc oxide (ZnO) and magnesium oxide (MgO). In addition to these activators, there can be used fatty acids or fatty acid salts such as zinc stearate. Fatty acids and zinc oxide are incorporated to form a zinc or magnesium salt that functions as a cation donor Usually, in PP resins these stearic salts are added with antacid function, with no function to alter reaction kinetics of the modifiers. In its turn, the invention of the present application describes the effect of stearic salts on the polypropylene modification process.

OBJECTS OF THE INVENTION

A first object of the present invention is to provide a process for the production of a modified polypropylene.

A second object of the present invention is to provide a modified polypropylene having g' lower than 1, $B_n$ higher than 0.1, and IF lower than 100 g·10 min, as well as its use.

A third object of the present invention is to provide a polymer blend comprising the modified polypropylene in accordance with the present invention.

BRIEF DESCRIPTION OF THE INVENTION

The objects of the present invention are achieved by means of a process comprising adding a masterbatch prepared by dispersing BSA in a polyolefin and at least one fatty acid salt with a metal cation in the polypropylene to be modified.

The present invention has the advantages of controlling type length of branches in the modified polypropylene, as well as an optimized reaction of the coupling agent, minimizing by-product formation.

Furthermore, the modified polypropylene of the present invention has a reduced content of residues and, consequently, a better performance in many applications such as foaming, blowing, thermoforming, film extrusion, BOPP, spinning, among other molding techniques. In addition, the modified polypropylene has a branching index (g') higher than that of those commercially available polymers due to its superior effectiveness in rheological modification by the generation of branches without the presence of gels.

BRIEF DESCRIPTION OF THE DRAWINGS

The present invention will be described in detail based on an example of a mode of execution depicted in the drawings, wherein.

DETAILED DESCRIPTION OF THE INVENTION

The present application refers to a process for the production of a modified polypropylene, comprising the following steps of:

(A) preparing a bis(sulphonazide) (BSA) masterbatch by dispersing BSA in polyolefin;

(B) adding (i) at least a fatty acid salt with a metal cation having valence 1+ to 3+, and (ii) the BSA masterbatch prepared in step (A) in the polypropylene to be modified.

By modified polypropylene it is meant a polypropylene (PP) that has undergone chemical modifications where the final product exhibits properties differing from a reactor polymer; in this case the presence of long branches. Among the modified polypropylenes, there can be included PP-HMS (High Melt Strength) which are polypropylenes with high melt strength wherein this can be due to the presence of branches or reduced IF.

Next, the steps and components used in the process for the production of the modified polypropylene of the present invention will be described in detail.

Step A: Preparation of a BSA Masterbatch

BSA masterbatch is prepared by dispersing BSA in polyolefin or other carrier in a extrusion process at a temperature lower than 190° C., preferably lower than 180° C.

Polyolefin, in the form of grains, pellets, powder, spheres or mixtures thereof, can be fed to an extruder.

The polyolefin used in the preparation of BSA masterbatch is selected from polyolefin, poly-alpha-olefins, polypropylene, copolymers of ethylene and alpha-olefins having from 3 to 10 carbon atoms, copolymers of propylene and ethene and/or alpha-olefins having from 4 to 10 carbon atoms, wherein polypropylene is preferably used. The polypropylene used in the composition of the masterbatch can be selected from the group comprising homopolymers, copolymers, heterophasic copolymer/homopolymer matrix (HECO) of random propylene/alpha-olefin heterophasic copolymer matrix (RAHECO) and/or random copolymer (RACO) comprising propylene/ethylene and/or α-olefin containing from 4 to 10 carbon atoms. IF of the polypropylene may vary between 1 and 300 g/min.

Figure 1:
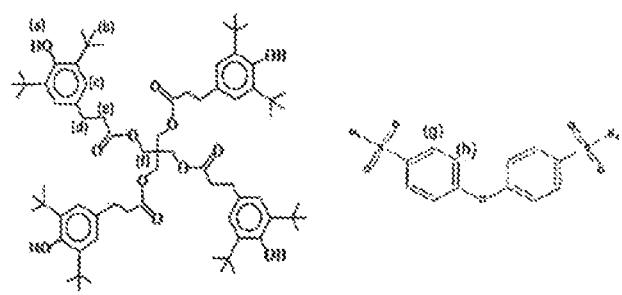
FIG. 1 illustrates molecular structures of Irganox® 1010 and of DPO_BSA.

The term "BSA" means bis(sulphonazide). Bis(sulphonazides) can be selected from sulfonyl azides, poly(sulfonyl azides), phosphazene azides, poly(phosphazene azides), silyl acides, poly(silyl azides), formyl azides, poly(formyl azides), azides, poly(azides), N-chlorosulfonamide salts, N,N-dichlorosulfonamides, inner salts of 2-trialkyl-1-sulfonylhydrazides, diazo alkanes, poly(diazo alkanes), geminally-substituted methylene groups, ketenes, metallocarbenes, among others and mixtures thereof, 4,4'-diphenyl ether bis(sulphonazide) (DPO-BSA). BSA can be in liquid form, suspension, solid or physical mixtures with polymer and also in molecular melt form. Molecular melt is a mixture of DPO-BSA with an antioxidant (FIG. 1), wherein it is more commonly to use DPO-BSA with an antioxidant of tetrakis[methylene (3,5-di-t-butyl-4-hydroxyhydrocinnamate)]-methane (commercially known as Irganox 1010 supplied by BASF—The Chemical Company).

The amount of BSA in the masterbatch is up to 7.5%. When the BSA used is in the form of molecular melt, the amount of molecular melt must be between 5% and 35% in the masterbatch composition, preferably between 7% and 15%.

The BSA masterbatch of the present invention comprises at least one antioxidant selected from the group consisting of phenolics, thioesters, phosphites, phosphates, etc., commonly used in polyolefin. When BSA is used in the form of molecular melt, the addition of antioxidants is optional due to the fact that molecular melt already contains antioxidants in its composition.

Optionally, fatty acid salts with metal cations or compatibilizers can be added. The fatty acid salts containing metal cation are, preferably, stearates whose cation is selected from cations having valence of $1^+$ to $3^+$, and more preferably selected from the groups comprising Ca, Zn, Mg, Na, Li and Ba.

Furthermore, the masterbatch of the present invention optionally comprises other additives such as antacids, crystallization nucleants, COF (friction coefficient) controllers, compatibilizers, flow auxiliaries, plasticizers, etc., which are capable of enhancing the performance of the composition. Nevertheless, addition of these additives in the masterbatch is not recommended because azide functional group possesses strong chemical interaction with acids and bases so that undesired reactions may occur.

Figure 2:
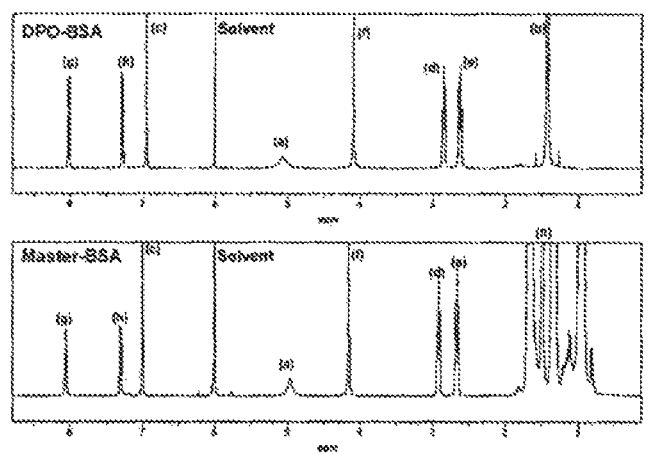
FIG. 2 illustrates a spectrum of $^1$H NMR of DPO_BSA and BSA masterbatch.

It is expected that after extrusion, BSA chemical characteristics are maintained. FIG. 2 illustrates results of H NMR analyses for the molecular melt and polypropylene masterbatch prepared with molecular melt. It is observed that DPO-BSA remains unchanged. Peaks characteristic of hydrogens in aromatic rings do not present chemical shift and background noises, which are indicative that no alteration in the product has occurred in the preparation of the masterbatch.

Figure 3:
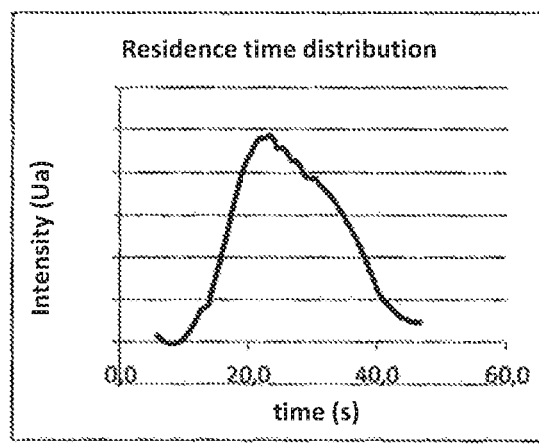
FIG. 3 illustrates residence time distribution for the preparation of a BSA masterbatch in extrusion.

The extruder used in the masterbatch preparation can be a single screw, double screw or planetary extruder, interpenetrating or non-interpenetrating extruder, counter-rotating or co-rotating extruder, said extruder having L/D (screw length/diameter) higher than 20. Preferably, the extruder used is a double screw, co-rotating, interpenetrating extruder. Residence time distribution can be seen in FIG. 3. Residence time in the masterbatch preparation must be less than 40 s. The average residence time is 20 s.

Figure 4:
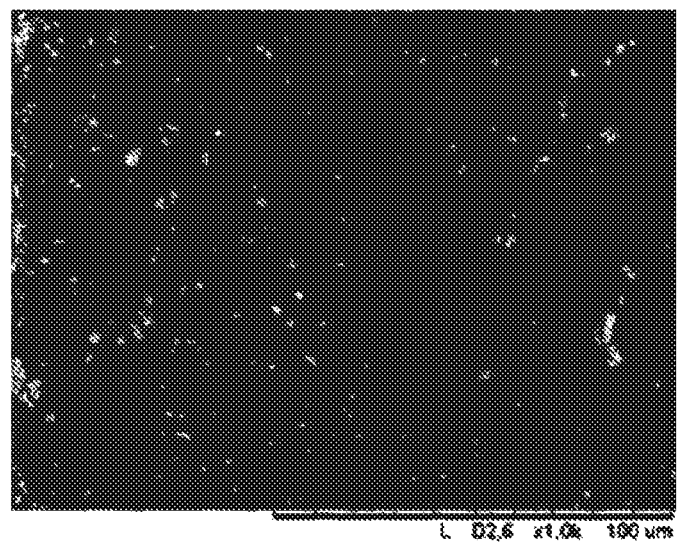
FIG. 4 illustrates a particle size distribution of BSA in the masterbatch (MEV), MEV image.

The dispersion is obtained by right selection of screw profile suitable for process specifications, reflecting a significant reduction in the particle size of about 800 mm for a median diameter lower than 5 mm and a length range lower than 10 mm exemplified in FIG. 4. A reduction of BSA domains and/or molecular melt to median values lower than 50 mm is expected.

BSA masterbatch obtained in the first step (A) of the process can be directly metered into the extruder and then automatically conveyed to the next step (B) of the process; or it can be obtained in first step (A) in the form of grains, pellets, spheres, powder or mixtures thereof, and stored for further use.

Step B: Propylene Modification

Step B of the process comprises adding:

(i) at least one fatty acid salt with metal cation having valence of $1^+$ to $3^+$, (ii) the BSA masterbatch obtained in step (A)

to the polypropylene to be modified.

The polypropylene to be modified can be selected from the group comprising homopolymers, copolymers, heterophasic copolymer/homopolymer matrix (HECO) of random propylene/alpha-olefin heterophasic copolymer matrix (RAHECO) and/or random copolymer (RACO) comprising propylene/ethylene and/or α-olefin containing from 4 to 10 carbon atoms. IF of the polypropylene may vary between 1 and 300 g/min. The polypropylene to be modified can be in the form of grains, pellets, powder, spheres or mixture thereof.

Mixing of components is carried out in a extruder at a temperature of up to 270° C., preferably lower than 250° C., The extruder used in the masterbatch preparation is a single screw, double screw or planetary extruder, interpenetrating or non-interpenetrating extruder, counter-rotating or co-rotating extruder and it can be an industrial extruder having a diameter higher than 250 mm and L/D (screw length/diameter) higher than 10; or a compounding extruder having a diameter of 20 to 250 mm and L/D higher than 25. The extrusion residence time of step B should be lower than 30 s.

The fatty acid salts containing metal cation are preferably stearates whose cation is selected from cations with valence of $1^+$ to $3^+$, preferably Ca, Zn, Mg, Na, Li, and Ba. More preferably, said cations are selected from Zn and Mg. The amount of fatty acid salts containing metal cation may vary from 200 to 6000 ppm (parts per million) based on total mass of modified PP.

Optionally, antioxidants can be added to the polypropylene to be modified, i.e. in the second step (B) of the present process. These antioxidants can be selected from phenolics, thioesters, phosphites, phosphates, etc., which are capable of presenting the same desired performance.

In addition to antioxidants, there can be added to the polypropylene to be modified other additives commonly used in the preparation of polymers, such as crystallization nucleants, flame retardants, pigments, anti-UV agents, COF (friction coefficient) controllers, mold-release agents, IR absorbing agent, demolding auxiliaries, lubricants, flow auxiliaries, etc., which are capable of presenting the same desired performance.

The BSA masterbatch is added to the polypropylene to be modified in an amount sufficient for the amount of BSA in the final composition (modified polypropylene) to be between 200 and 2000 ppm—depending on the desired degree of modification.

Since the present invention refers to a better performance process, it is predicted that the masterbatch route uses a lower amount of BSA to modify polypropylene when compared to conventional processes which use directly metering of the powder. Hence, a reduction of BSA residues in the final product is observed, which permits its use in application having direct contact with food products. The modified polypropylene of the present invention has an amount of residues lower than 6 ppm. In addition, the masterbatch-using process generates products having a lower consumption of antioxidants and better color aspect because it does not consume Irganox 1010® antioxidant, for example, when molecular melt is used.

Steps (A) and (B) of the process of the present invention may take place in independent or integrated from. When in independent form (such as, for example, in compounding extruders), the masterbatch obtained in step (A) can be in the form of grains, which can be packed and added in step B as an additive even after it has been stored. In an integrated from, extrusion of the masterbatch may occur in an extruder integrated with another extruder, such as, for example, industrial extruder, in which the PP modification reaction occurs. In this case, the masterbatch can be directly metered into the industrial extrusion system with no need to pack the masterbatch. In both cases, the extrusion process may or may not be in line with the process for polymerization of the polypropylene used as base resin.

The process of the present invention provides for a better control in the configuration (type and length) and amount of generated branches, reducing the crosslinking occurrence. By means of the present process, a modified polypropylene is obtained which is suitable for use in foaming processes and other applications such as foaming, thermoforming, blowing, ISBM, extrusion of tubular films, blown films, flat films, BOPP, fibers, raffia, injection, recoating, blowing, etch, which require lower levels of branching from the resin.

The modified polypropylene obtained from the process of the present invention has a branching index (g') lower than 1, branching number ($B_n$) higher than 0.1 and IF lower than 100 g/10 min. Preferably, the modified polypropylene has a g' higher than 0.55 and lower than 1 and $B_r$ lower than 4 atoms per 1000 carbon atoms.

In accordance with the process of the present invention, a modified polypropylene can be obtained which has suitable properties for foaming and has a g' lower than 0.75 and $B_n$ higher than 2 and less than 4 atoms for every 1000 carbon atoms. Furthermore, this polypropylene has a melt strength higher than 30 cN, extensibility higher than 11 cm/s, activation energy lower than 120 kJ·mol and IF between 2 and 6 g/10 min.

In addition, despite the lower number of branches, the modified polypropylene of the present invention does not contain restrictions as to the blends (mixtures) with other polymers because the superior rheological alterations are kept even in blends. Blends comprising said modified polypropylene maintain the properties foreseen by the present invention when compared to blends comprising already existing branched products. The polymer blends formed with the modified PP of the present invention can comprise linear homopolymer, random and heterophasic homopolymer and copolymers, low density polyethylene (LDPE)), low density linear polyethylene (LLDPE), high density polyethylene (HDPE), ethylene propylene thermoplastic rubber (EPR), ethene/olefin copolymer, ethylene vinyl acetate copolymer (EVA), ethene/octane copolymer, ethene/butane, ethene hexene, The modified PP can be present in polymer blends in amounts ranging from 5% to 95%.

The propylene modification process of the present invention is an optimized process that provides for the control of amount, type and size of branches. IF of the masterbatch resin has an essential effect on the properties of the modified polypropylene, wherein it is crucial for the control of branch length. The use of zinc stearate, for example, in the modification step (Step B) tends to favor the formation of non-reticulated, branched modified structures. Thus, by means of masterbatch route, adjustment of IF of the masterbatch carrier and addition of stearates of metals having valence of from $1^+$ to $3^+$ in the modification steps, the branch length and branched form are controlled, thus optimizing the reactions of coupling agent and avoiding significant by-product formation.

Another advantage of the process in accordance with the present invention is that in a short time of mixing in an industrial extrusion (Step B), residence time of about 30 s, the mixing capacity is limited. Therefore, the previous dispersion of BSA in the masterbatch makes the process less dependent on this limitation due to the enlargement of the contact area and, consequently, the modification is enhanced, The reaction still undergoes strong influence of the molar mass of the masterbatch vehicle. Thus, when the IF of the resin of the masterbatch is lower there the generated branches tend to be longer and these branches will have stronger influence on the rheological properties of the modified resin. As result of the combination of these different factors, there can be generated a polymer suitable for different processing types, with lower number of branches than polymers produced by other technologies.

Tests

Determination of Eta0

To determine the property of the material Eta0($\eta_o$), referring to the viscosity of the material without shearing, Carreau Yasuda model having 5 parameters was used:

$$\frac{\eta - \eta_{inf}}{\eta_o - \eta_{inf}} = [1 + (\lambda * \dot{\gamma})^a]^{\frac{(n-1)}{a}}$$

For the application of this model, curves obtained in rotational rheometry were used (in this case Anton Paar MCR 501 rotational rheometer having geometry of parallel plates with 25 mm in diameter and distance between the plates of 1 mm, in the linear viscoelasticity region, in a frequency range of 0.0628 to 628 rad/s at 200° C.) by setting the model to the point obtained in the equipment.

From these analyses it is possible to draw PI values (polydispersity index), which are a relationship with the crossing between resin elastic and viscous moduli of the resin.

$$PI = \frac{10^5}{Gc}$$

wherein Gc is the crossing module.

Activation Energy

It is known in the literature that branched polymers have higher flow activation energy (Ea) than linear polymers. Table 1 shows values found in the literature for linear and branched polymers:

TABLE 1

Flow activation energy values for polyolefins

| Ea (kJ/mol) | Polyethylene (PE) | Polypropylene (PP) |
|---|---|---|
| Linear | 27 | 42 |
| Branched | 45 | 75* |

*Deploy ® WB140HMS commercialized by Borealis

For calculation of the activation energy, several complex viscosity measurements were carried out at three temperatures (200, 215 and 230° C.). By way of reference, it is observed that highly elevated values mean that the system may have passed from a branching state to a crosslinking state, wherein even when low energy is applied significant changes in the entanglement/interaction of molecules are achieved.

Number of Branches and Branching Index

In order to better clarify the differences between the generated samples, references will be made to articles "Investigation of Long-Chain Branching in HDPE using Triple-Detector GPC (Hammons, J. et al. Annual Technical Conference ANTEC, 2002)" and "Characterization of Complex Polymer Systems by Size Extrusion Chromatography—Homopolymers With Long Chain Branching and Copolymers With Composition Drift (Hamielec, A. Pure & Appi. Chem., Vol. 54, No. 2, pp. 293-307. 00334545/82/020293-15$03.00/0 Great Britain, 1982). Therefore, g' (branching index) corresponding to equation below:

$$g' = \frac{IV_{Br}}{IV_L}$$

where $IV_{Br}$ is the intrinsic viscosity of modified resins; and $IV_L$ is the intrinsic viscosity for one same data of Mw (molar mass).

Considering that branched resins tend to present intrinsic viscosity lower than a linear resin having the same molar mass and this stems from the fact they have a lower degree of interpenetration of hydrodynamic volumes (in the case of concentrated solutions) or are less bulky structures, consequently g' values of resins are always lower than 1 when having branches. Thus, the lower the g' value, the higher the $B_n$ value will be. The number of branches ($B_n$) is calculated from the data of branching index (g').

$$g' = \left[\left(1 + \frac{B_n}{7}\right)^{1/2} + \frac{4.B_n}{9}\right]^{-1/2}$$

Rheologically, $B_n$ can be estimated by determining the viscosity Eta0, where in this work the Carreua-Yasuda model about frequency scanning data was used, as written in the article by Tsenoglou, C. J., Gotsys, A. D., Macromolecules, 2001, 34, 4, 4685. This method is much more consistent and fast when compared to GPC (Gel Permeation Chromatography) or SEC (Size Exclusion Chromatography), in addition to being less susceptible to errors because it uses direct measurements of rheology based on the viscosity zero of the sample before and after modification:

$$B_n = \frac{\ln(\eta_r)}{\alpha.\left[\left(\frac{M_L}{M_C}\right) - 1\right] - 3.\ln\left(\frac{M_L}{M_C}\right)}$$

where:

$$\eta_r = \frac{\eta_{0_B}}{\eta_{0_L}}$$

and $\eta_{OB}$ is the viscosity zero of the modified (branched) resin;

$\eta_{OL}$ is the viscosity of the resin of the (linear) modification;

$M_L$ is Mw of the resin to be modified;

$M_c$ is the critic molar mass for PP—11200 g/mol; and $\alpha$=0.42.

RSI and On-Set of Strain Hardening

These analyses were made in Rheotens 71.9 equipment (Göttfert) coupled to lab extruder Haake (Thermo Haake Rheomex) with a capillary diameter of 2 mm and 20 mm in length, a distance of 50 mm of pulleys and acceleration of 60 mm/s², at a temperature of 190° C.

Figure 5:
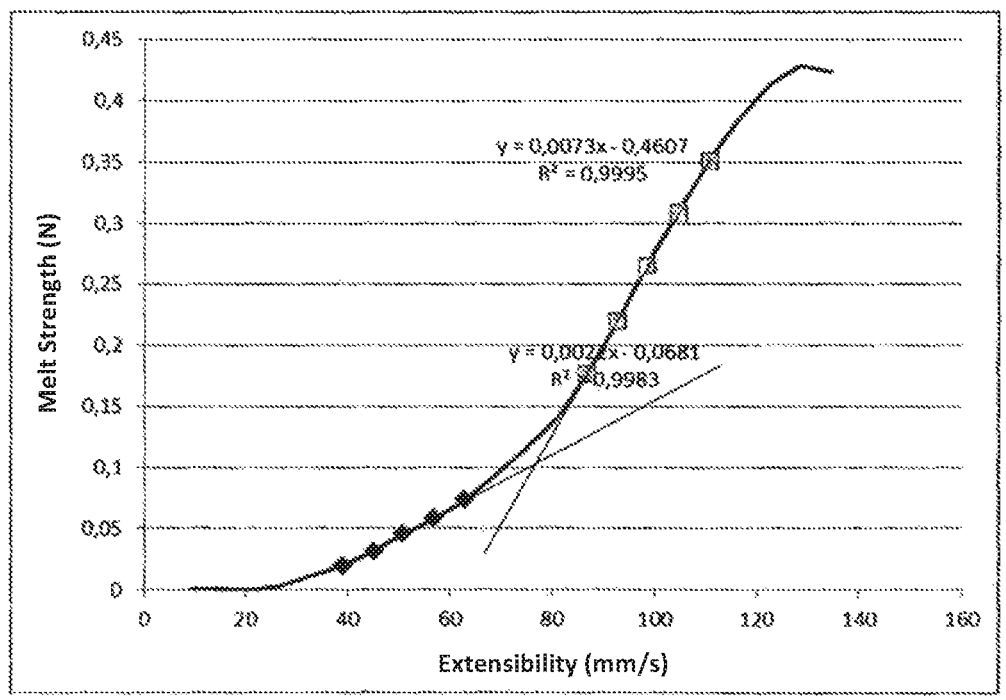
FIG. 5 illustrates a graphic pattern of melt strength versus extensibility and parameters for the calculation of properties.

FIG. 5 illustrates an example of a graph that shows values of forcexextensibility, and the following treatment is performed:

$$RSI = \frac{slope_{II}}{slope_I}$$

where,

RSI: ratio of slopes is a variation of the slope of the curve from the beginning of the curve relative to the region with strain hardening.

On-set: is the theoretical point of behavior regime change.

For some polypropylenes, it is possible to differentiate the behavior of products with good performance in the foaming process and are, or have already been, commercialized (Table 2):

TABLE 2

Parameters of analysis of melt strength curve for commercial resins

|  | SHI | RSI | on set | slope I | slope II | b1 | b2 |
|---|---|---|---|---|---|---|---|
| PF 814 | 12.7 | 4.26 | 85.45 | 0.0019 | 0.0081 | −0.578 | −0.5876 |
| WB140HMS | 15.1 | 3.83 | 68.83 | 0.0023 | 0.0088 | −0.0637 | −0.5111 |
| WB130HMS | 12.6 | 3.32 | 76.98 | 0.0022 | 0.0073 | −0.0681 | −0.4607 |

RSI values indicate how much of the polymer hardens by deformation. On-set value relates to the generated branching type and in which deformation degree the strain-hardening begins.

From the characterizations, it is possible to identify that PP-HMS products recognized by the market have different characteristics, something that is not possible to distinguish from another form or technique. Generally, the higher the RSI values and different branching forms generate lower on-sets (beginning of hardening). However, the different forms of branches generate on-set characteristics.

Another measurement commonly used is SHI, described as:

$$SHI = \frac{\sigma_{100}}{\sigma_{50}}$$

where

SHI stands for stress hardening index)

σ stands for stress; and the relation between stresses and extensibility is 100 mm/s and 50 mm/s.

SHI is an indicative of non-linearity of stress at different extensibilities but it hardly will be able to differentiate HMS-PP resins. A first evaluation can be carried out with SHI value, but it is necessary to evaluate the entire profile of the obtained curve so as to understand whether the resin properties are appropriate. In the foaming process, for example, it is ideal that the force, in the first step, is very low to permit the process to start and then hardening should occur to prevent rupture/collapse of cells formed by expanding gas.

From the analyses, Eta0, Force, extensibility, SHI, RSI (slope ratio) and number of branches are determined.

Example 01—Powder—Polymer and Masterbatch-Polymer Mixture

In this example, there have been considered two modification processes: polymer modification by addition of BSA powder and modification process of the present invention using BSA masterbatch.

Table 3 shows the component characteristics used and Table 4 lists the properties obtained after modification.

TABLE 3

Samples used in PP modification

| Sample | IF of resin to be modified | DBPO-BSA (ppm) | Masterbatch carrier | IF of masterbatch carrier (g/10 min) | Fatty acid salt |
|---|---|---|---|---|---|
| BSA powder | 17 | 1500 | — | — | — |
| BSA masterbatch | 17 | 1500 | PP | 100 | — |

TABLE 4

Properties of PP modified with the samples of Table 3

|  | IF (g/10 min) | PI | Force (cN) | Ea (kJ/mol) |
|---|---|---|---|---|
| PP modified with BSA powder | 6.42 | 10.9 | 28.7 | 180 |
| PP modified with BSA masterbatch | 1.19 | — | 35.1 | 120 |

Figure 6:
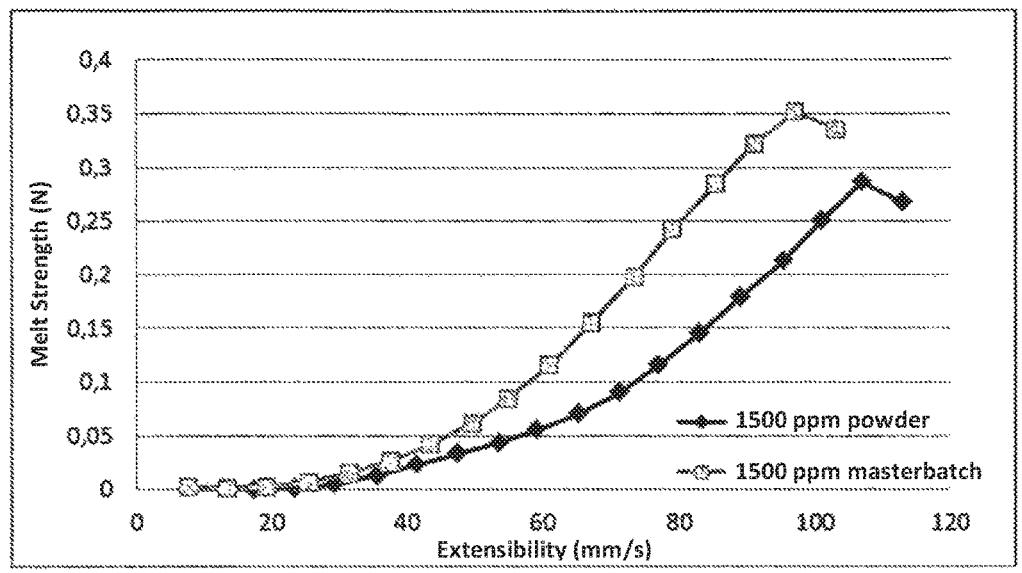
FIG. 6 illustrates a graph of melt strength of PP modified with BSA powder and BSA masterbatch.
Figure 7:
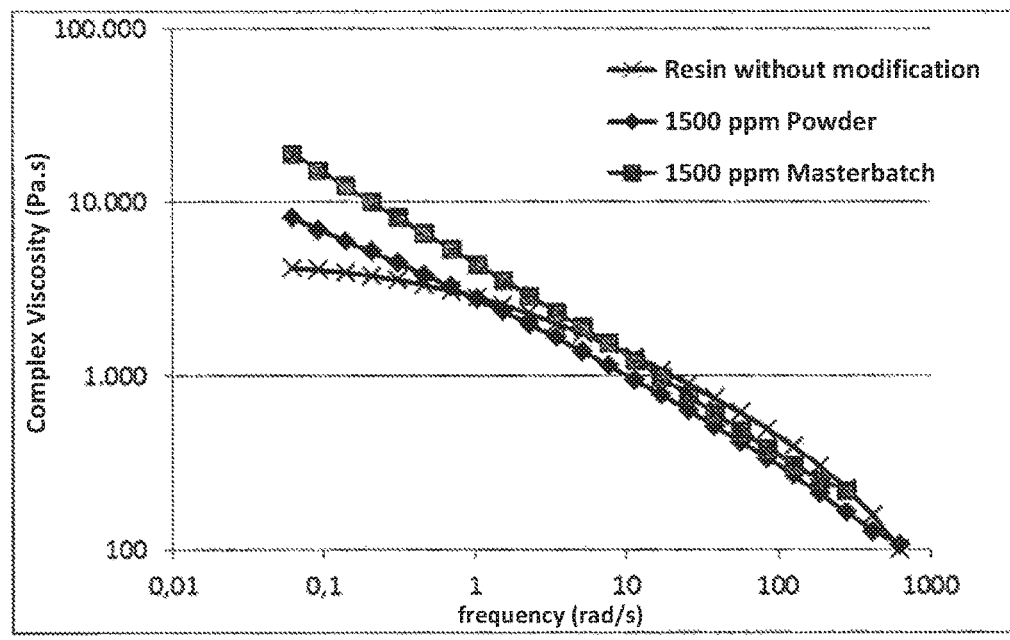
FIG. 7 illustrates a graph of complex viscosity for modified PP with BSA powder and BSA masterbatch.
Figure 8:
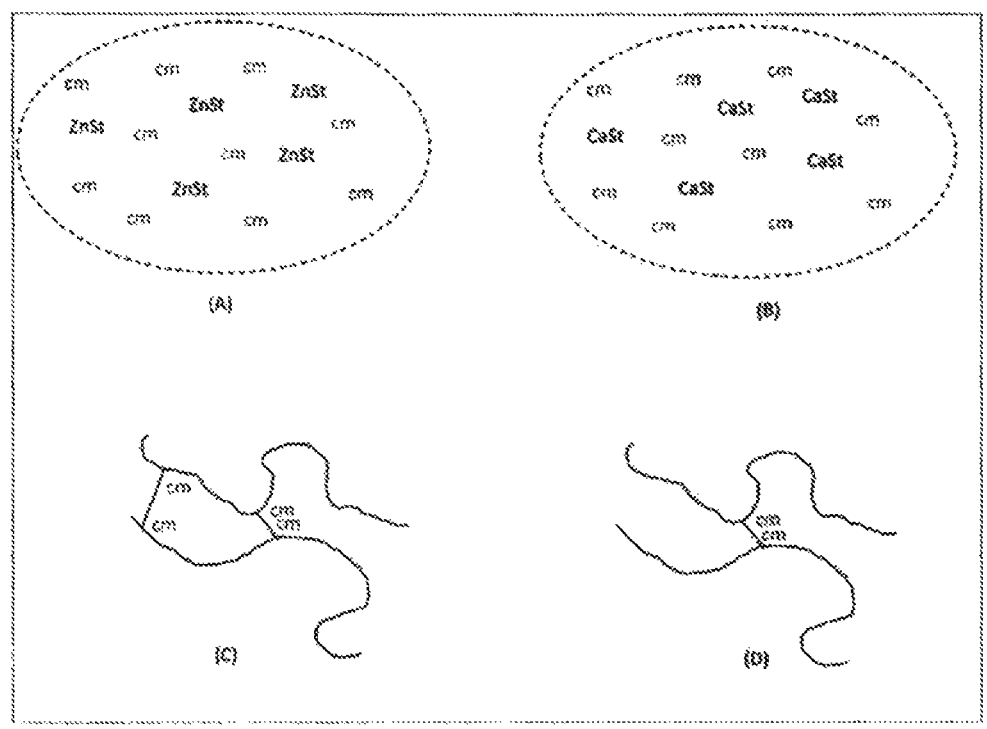
FIG. 8 illustrates a scheme representing BSA masterbatch using calcium stearate and zinc stearate and effects thereof on the formation of PP branching.

From graphs illustrated in FIG. 6 and FIG. 7, it can be observed that there is much more strong modification effect when BSA masterbatch is used instead of addition of only BSA powder to the PP polymer. In addition to higher viscosity, higher melt strength, there is a reduction in the activation energy of the system when the masterbatch is used. As already mentioned, the activation energy is a form of measuring the number of branches and also the branched/crosslinked structure. From the graphs it can be inferred that the use of masterbatch produces more branched structures than when only powder is used since the overall modification of the resin is greater but with lower activation energy. By using powder poor dispersion is generated, allowing for crosslinking formation.

Example 02-a—BSA Masterbatch with Ca and Zn Stearates

This Example shows the effect of using fatty acid salts on polypropylene modification. To this effect, BSA masterbatches containing calcium and zinc stearates and masterbatch without stearate have been used. The sample compositions are described in Table 5; and the properties observed in the modified PP are shown in Table 6.

TABLE 5

Samples of BSA masterbatch with or without calcium and zinc stearates.

| Sample | IF of resin to be modified | DBPO-BSA (ppm) | Masterbatch carrier | IF of BSA masterbatch carrier (g/10 min) | Fatty acid salt |
|---|---|---|---|---|---|
| BSA masterbatch with CaSt | 25 | 1125 | PP | 100 | Calcium stearate |
| BSA masterbatch with ZnSt | 25 | 1125 | PP | 100 | Zinc stearate |
| BSA masterbatch without stearates | 25 | 1125 | PP | 100 | None |

TABLE 6

Properties of the propylene modified
with the masterbatches of Table 5

| Sample | Force (cN) | Extensibility (cm/s) | SHI | PI | RSI | On-set |
|---|---|---|---|---|---|---|
| PP modified with BSA masterbatch containing CaSt | 22.60 | 12.60 | 7.43 | 7.30 | 2.43 | 87.83 |
| PP modified with BSA masterbatch containing ZnSt | 23.90 | 12.70 | 8.78 | 6.94 | 3.14 | 69.65 |
| PP modified with BSA masterbatch without stearates | 13.50 | 13.30 | 7.01 | 6.90 | 1.80 | 85.50 |

It is observed that the use of masterbatch containing stearates is much more effective in the resin modification, resulting in significantly better properties. Two mechanisms are proposed where the stearate can act as compatibilizers and/or as reaction accelerator.

Example 2-b—BSA Masterbatch with Ca and Zn Stearates

Figure 9:
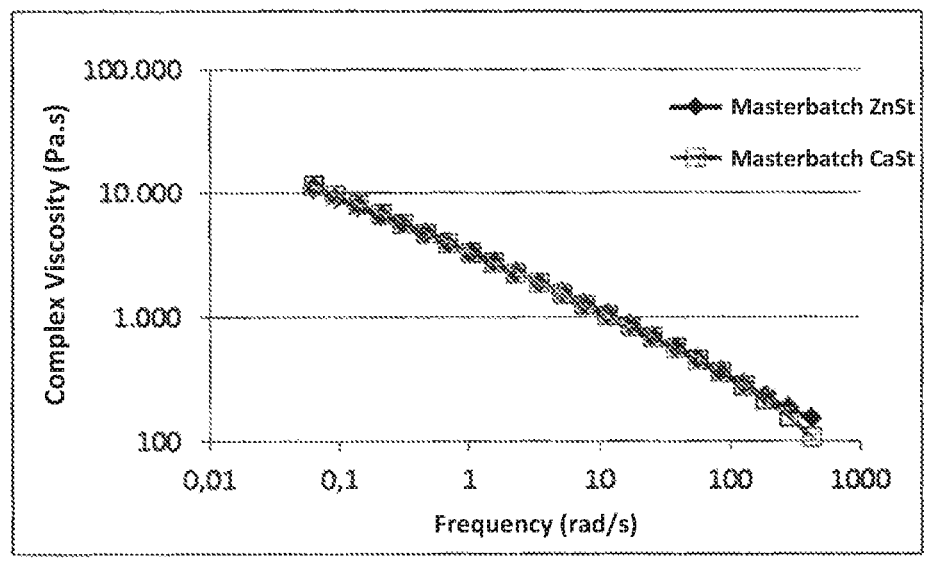
FIG. 9 illustrates a graph of complex viscosity for PP modified with BSA masterbatch containing zinc stearate and calcium stearate.

This example compares the use of calcium and zinc stearate in the PP modification. An illustrative scheme is shown in FIG. 9. BSA masterbatches with Ca and Zn stearate, IF of the resin being 100 g/10 min (masterbatch resin) and IF of the base resin (resin to be modified) being 17 g/10 min were used.

Figure 10:
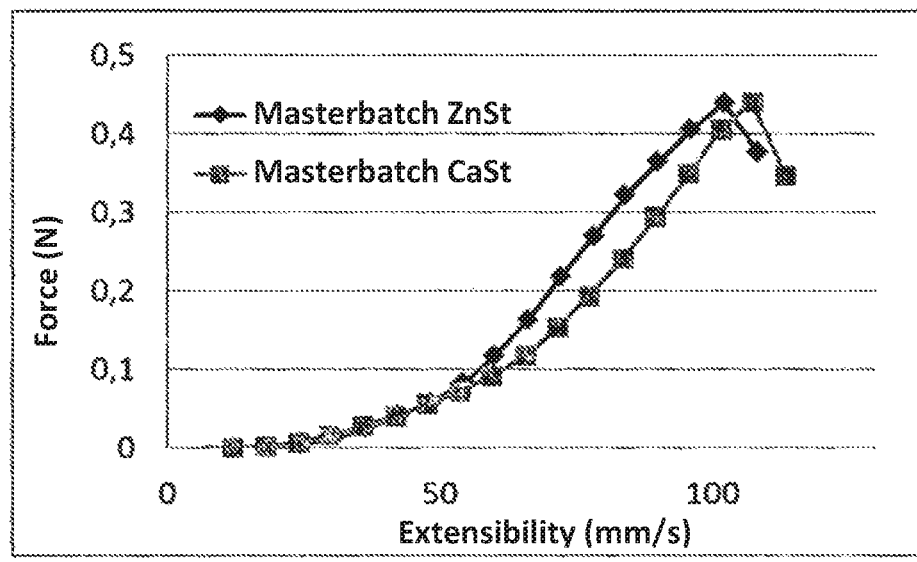
FIG. 10 illustrates a graph of melt strength for PP modified with BSA masterbatch containing zinc stearate and calcium stearate.
Figure 11:
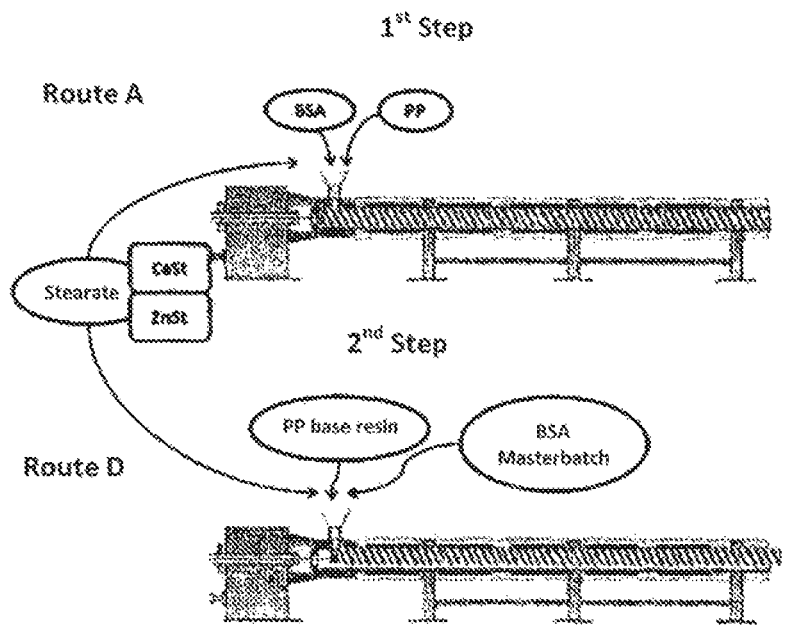
FIG. 11 illustrates PP modification routes.

The sample compositions are listed in Table 7. The properties observed in the modified polypropylene are described in Table 8, in FIG. 10 and FIG. 11.

TABLE 7

Samples for polypropylene modification: calcium stearate vs. zinc stearate

| Sample | IF of resin to be modified | DBPO-BSA (ppm) | Masterbatch carrier | IF of masterbatch carrier (g/10 min) | Fatty acid salt |
|---|---|---|---|---|---|
| BSA masterbatch with CaSt | 17 | 1375 | PP | 100 | Calcium stearate |
| BSA masterbatch with ZnSt | 17 | 1375 | PP | 100 | Zinc stearate |

TABLE 8

Properties of the polypropylene modified with samples of Table 7.

| Sample | Force (cN) | Extensibility (cm/s) | SHI | PI | RSI | On-set | Ea (kJ/mol) |
|---|---|---|---|---|---|---|---|
| PP modified with BSA masterbatch with CaSt | 44.3 | 10.6 | 12.7 | 15.9 | 3.9 | 67.3 | 93 |
| PP modified with BSA masterbatch with ZnSt | 44.0 | 10.5 | 13.2 | 14.2 | 3.4 | 55.6 | 120 |

From this example, it can be noted that the samples produced with masterbatch containing calcium stearate tend to exhibit PI values slightly superior to those of zinc stearate, and the Hardening Strain process starts with higher deformation values (on-set).

Another detail refers to the activation energy that is higher for samples modified with zinc stearates. These effects may lead one to believe that zinc stearate acts on the coupling reaction as well as on the vulcanization process by accelerating same. Hence, it is expected that the previous dispersion of zinc stearate in the BSA masterbatch prior to the modification reaction is not so adequate, wherein the reaction takes place at lower mixing times, thereby resulting in a higher number of couplings in one same molecule and generating a crosslinking degree higher than in the system with calcium.

Calcium stearate in turn acts on the dispersion of BSA but due to the fact that it does not accelerate the reaction it has a greater tendency to form branches, thereby preventing crosslinkages. In this case, zinc stearate, which is added in steps subsequent to the formation of the masterbatch, should act on the formation of masterbatch to accelerate the reaction in a high dispersion step, permitting that the free BSA residue is reduced to values lower than 3 ppm of active BSA and no release of sulfonamide in amounts higher than 3 ppm, wherein these values are suitable for applications in food products and beverages, in accordance with legal restrictions.

Example 03—Additivation Routes

Example 3 compares two additivation routes in the polypropylene modification process.

In route A, stearate is previously added to BSA masterbatch, and the additivated masterbatch is used in polypropylene modification.

In route D, stearate is added directly to the polypropylene to be modified.

Figure 12:
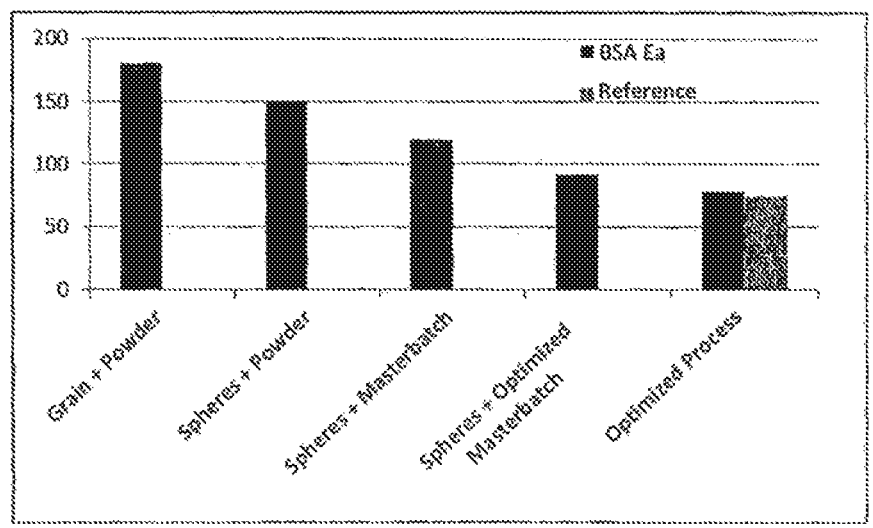
FIG. 12 illustrates a graph of activation energy evolution in accordance with modification process.

Routes A and D are illustrated in FIG. 12. In these routes the masterbatch composition is altered through additivation or non-additivation with stearates in its preparation step.

Two base resins (masterbatch carrier) with different IF were tested to determine their effect on the presence of calcium and zinc stearate. One PP homopolymer having IF of 25 g/10 min and the other PP homopolymer having IF of 100 g/10 min, as shown in Table 9.

TABLE 9

Samples for polypropylene modification

| Sample | IF of resin to be modified | DPO-BSA (ppm) | BSA masterbatch carrier | IF of BSA masterbatch carrier (g/10 min) | Fatty acid salt | Additivation route |
|---|---|---|---|---|---|---|
| AZN 25 (with BSA masterbatch) | 25 | 1250 | PP | 25 | Zinc stearate | A |
| AZN 100 (with BSA masterbatch) | 25 | 1250 | PP | 100 | Zinc stearate | A |
| ACA 25 (with BSA masterbatch) | 25 | 1250 | PP | 25 | Calcium stearate | A |
| ACA 100 (with BSA masterbatch) | 25 | 1250 | PP | 100 | Calcium stearate | A |
| DZN 25 (with BSA masterbatch) | 25 | 1250 | PP | 25 | Zinc stearate | D |
| DZN 100 (with BSA masterbatch) | 25 | 1250 | PP | 100 | Zinc stearate | D |
| DCA 25 (with BSA masterbatch) | 25 | 1250 | PP | 25 | Calcium stearate | D |
| DCA 100 (with BSA masterbatch) | 25 | 1250 | PP | 100 | Calcium stearate | D |

Example 3-a—Route A

Table 10 presents the properties observed in the polypropylene modified by route A.

TABLE 10

Properties of the modified polypropylene - Route A

| Sample | Force (cN) | Extensibility (cm/s) | SHI | PI | RSI | On-set |
|---|---|---|---|---|---|---|
| PP AZN 25 (with BSA masterbatch) | 13.80 | 12.50 | 6.47 | 6.67 | 2.50 | 92.50 |
| PP AZN 100 (with BSA masterbatch) | 23.90 | 12.70 | 8.78 | 6.94 | 3.14 | 67.83 |
| PP ACA 25 (with BSA masterbatch) | 16.40 | 12.80 | 7.17 | 5.88 | 1.50 | 82.17 |
| PP ACA 100 (with BSA masterbatch) | 22.60 | 12.60 | 7.43 | 7.30 | 2.43 | 69.55 |

Under this mixing condition, it is observed that in the presence of stearate in the preparation of the masterbatch there is a tendency to result in higher values of target properties when using resins with higher IF in the masterbatch preparation, probably because of easy dispersion due to the viscosity and wettability thereof.

Nevertheless, when stearates are only mixed in the resin modification step (route D) a behavior inversion is observed.

Example 3-b—Route D

Table 11 shows the properties observed in the polypropylene modified according to route D.

TABLE 11

Properties of the modified polypropylene

| Sample | Force (cN) | Extensibility (cm/s) | SHI | PI | RSI | On-set |
|---|---|---|---|---|---|---|
| PP DZN 25 (with BSA masterbatch) | 29.60 | 12.70 | 9.14 | 8.70 | 4.31 | 86.93 |
| PP DZN 100 (with BSA masterbatch) | 14.10 | 12.70 | 7.06 | 6.85 | 2.44 | 79.23 |

TABLE 11-continued

Properties of the modified polypropylene

| Sample | Force (cN) | Extensibility (cm/s) | SHI | PI | RSI | On-set |
|---|---|---|---|---|---|---|
| PP DCA 25 (with BSA masterbatch) | 23.40 | 12.10 | 7.95 | 7.30 | 3.69 | 87.51 |
| PP DCA 100 (with BSA masterbatch) | 15.20 | 12.10 | 7.55 | 6.62 | 2.64 | 87.94 |

A strong tendency to achieve better properties with resins having lower IF values is observed upon mixing stearates in the modification step. When the modification in the masterbatch preparation is not activated, the process should consist of a preferential reaction with molecules having greater molar mass, generating longer branches, which are more effective in improving properties. In comparison with Example 3-a, it is observed that in this process the level of some properties were higher, such as SHI, PI and RSI for the sample to which zinc stearate was added. It can then be concluded that when Zn stearate is added to the masterbatch same tends to form crosslinked structures and if added in the modification step it will only contact the BSA molecule after same are dispersed in the base resin of the masterbatch and as a result a higher number of long branches are formed at the end of the process.

Example 4—Effects of Modification with BSA on Resins

In this example, the effects of the modification with BSA on resins are compared wherein different compositions and forms of the components are used, as can be seen in Table 12.

TABLE 12

Different forms of addition of BSA in the PP

| Sample | IF of resin to be modified | DPO-BSA (ppm) | Carrier | IF of the carrier (g/10 min) | Fatty acid salt | Additivation step |
|---|---|---|---|---|---|---|
| PP pellet + powder (BSA) | 30 | 1250 | — | — | CaSt | 2° |
| PP spheres + powder (BSA) | 17 | 1250 | — | — | CaSt | 2° |
| PP spheres _BSA masterbatch | 17 | 1250 | PP | 100 | CaSt | 2° |
| PP spheres + optimized BSA masterbatch* | 25 | 1250 | PP | 25 | CaSt | 2° |
| Optimized process* | 25 | 1250 | PP | 25 | CaSt | 1° |

*better compositions and better process conditions

Figure 13:
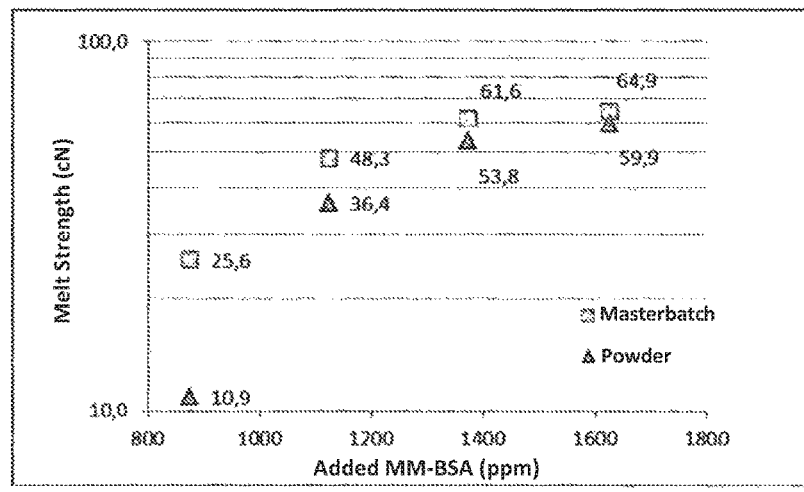
FIG. 13 illustrates a graph showing the melt strength results compared to the results between BSA powder vs. BSA masterbatch.

Observing FIG. 13 referring to the activation energy, there is a description of the evolution with changes in the process and mixture, demonstrating how much it develops to obtain a purely branched sample instead of crosslinked samples. Linear systems are less sensitive to temperature variations, that is, an increase in temperature causes lower variations in the molecule motility. The presence of long branches causes the PP chains to be more sensitive to temperature, thereby increasing Flow Activation. Activation evolution energy in accordance with the technology advance makes it possible to control the generated modification type, leading to an improvement so as to obtain a system having branches tending to a lower number of crosslinkages, thereby resulting in a better enhancement in the system.

Example 5—Comparison of Addition of BSA Powder Vs. Via Masterbatch

After optimization of compositions and sequencing of the sample preparation, the route via masterbatch is compared to direct addition of powder as shown in Table 13.

TABLE 13

Form of addition of BSA: powder vs. masterbatch

| Sample | IF of resin to be modified | BSA (ppm) | Carrier | IF of carrier (g/10 min) | Fatty acid salt | Additivation step |
|---|---|---|---|---|---|---|
| 1 | 20 | 875 | — | — | ZnSt | 2° |
| 2 | 20 | 1125 | — | — | ZnSt | 2° |
| 3 | 20 | 1375 | — | — | ZnSt | 2° |
| 4 | 20 | 1625 | — | — | ZnSt | 2° |
| 5 | 20 | 875 | PP | 25 | ZnSt | 2° |
| 6 | 20 | 1125 | PP | 25 | ZnSt | 2° |
| 7 | 20 | 1375 | PP | 25 | ZnSt | 2° |
| 8 | 20 | 1625 | Pp | 25 | ZnSt | 2° |

Figure 14:
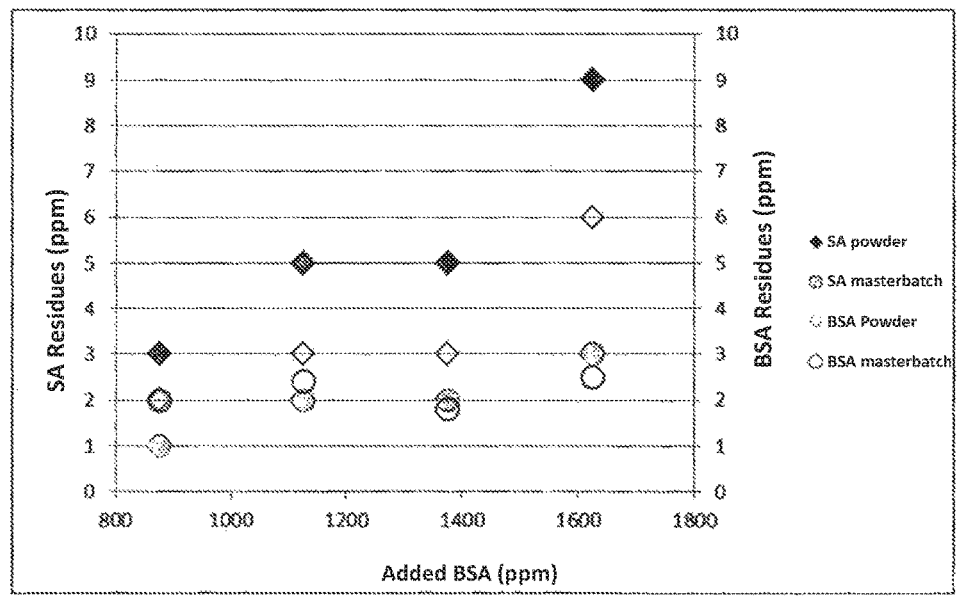
FIG. 14 illustrates a graph showing residual contents of BSA and SA compared to the results of routes of BSA powder vs. BSA masterbatch.

From FIG. 14, it can be observed that the addition of BSA in the form of masterbatch is substantially more effective, mainly for amounts lower than 1375 ppm. This means that pre-dispersion of the masterbatch, correct choice of the mixing sequencing, IF of the masterbatch carrier, permits a better distribution and more homogeneous reaction throughout the sample. With higher concentrations, the tendency decreases, but it remains being effective.

Example 6—Control of Unreacted BSA and SA (Sulphonazide) Residues

Figure 15:
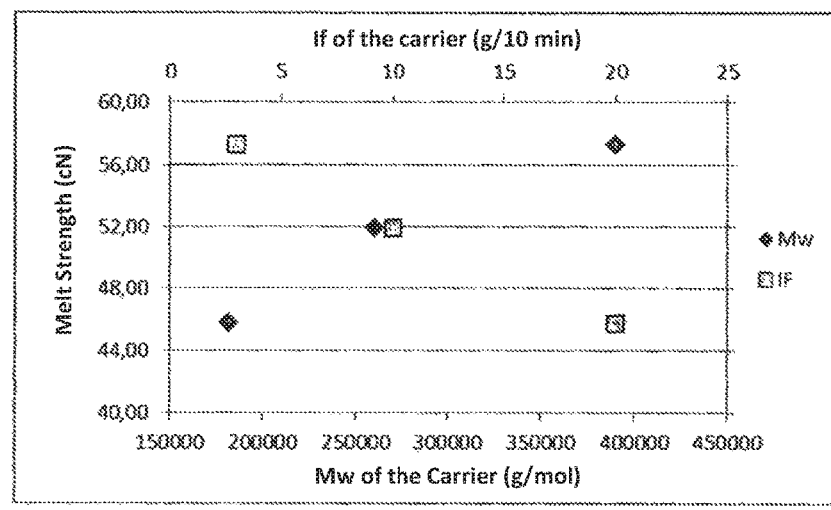
FIG. 15 illustrates the effect of molar mass of the masterbatch carrier on the melt strength of the modified PP.

In the samples of Example 5, where FIG. 15 shows the results obtained for the tested samples, it is observed that, in addition to all benefits of the masterbatch route in terms of control of branches and length, there is a drastic reduction in the amounts of free SA in the system, whereby the application for contact with food products is possible according to different legislations in force around the world.

In the products prepared via masterbatch it is clear that the amounts of SA residues are minimal, very near the target values for use in contact with food products. Thus, the technological route becomes viable for all foam applications, with not regulation/legislation restrictions. The values disclosed in this example are the values for resin in form of pellet, prior to the foaming process. The amounts after the foaming process are still lower since the resin is usually diluted in the final composition of the thickeners and the reheating will consume BSA residues.

Example 7—Evaluation of IF of the Carrier in the Properties of the Modified PP

The tested formulations are disclosed in Table 14. As inferred from the former examples, there has been indicated that IF of the masterbatch carrier acted as an important variable on the final properties of the modified PP. This example goes a bit deeper in the gains of this process. The obtained results are shown in Table 15.

TABLE 14

Characteristics of the carrier resins, masterbatch and preparation of sample for Example 7.

| Sample | IF of resin to be modified | DPO-BSA (ppm) | BSA masterbatch carrier | If of BSA masterbatch carrier (g/10 min) | Mw (g/mol) | Fatty acid salt | Additivation route |
|---|---|---|---|---|---|---|---|
| 1 | 25 | 1250 | PP | 25 | 180000 | Zn | D |
| 2 | 25 | 1250 | PP | 10 | 260000 | Zn | D |
| 3 | 25 | 1250 | PP | 3 | 380000 | Zn | D |

TABLE 15

Properties obtained from the samples of Example 7.

| Sample | RF (cN) | Extensibility (cm/s) | Eta 0 (×10³) | SHI | RSI | On-set | Bn | G' | Gels |
|---|---|---|---|---|---|---|---|---|---|
| 1 | 45.7 | 12.8 | 31.5 | 13.9 | 3.80 | 68.8 | 2.328 | 0.676 | <0.1% |
| 2 | 51.9 | 12.1 | 32.0 | 14.7 | 4.18 | 62.9 | 2.339 | 0.675 | <0.1% |
| 3 | 57.2 | 12.3 | 33.3 | 15.5 | 4.38 | 60.6 | 2.366 | 0.673 | <0.1% |
| Commercial Reference | 45 | 12.3 | 38 | 15.1 | 3.83 | 68.8 | 4-8 | 0.44-0.57 | <0.1% |

Figure 16:
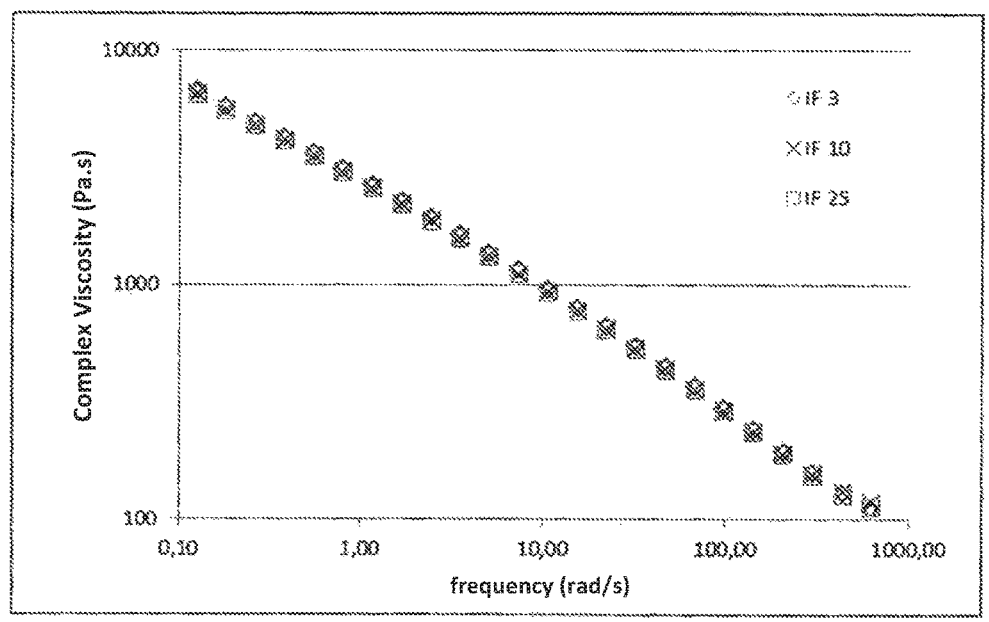
FIG. 16 illustrates the effect of molar mass of the masterbatch carrier on the complex viscosity of the modified PP.

After modification of the sample, the following results shown in FIG. 16 were obtained. Alteration in the melt strength is proportional to Mw where the higher the molar mass of the masterbatch carrier the higher the melt strength (RF) of the modified sample. In viscosity graphs (FIG. 16) no alterations of viscosity have been observed, wherein this effect on the RF increase resulted only from the insertion of longer branches in the reactive extrusion process. This effect is a technological nonsense from the masterbatch preparation viewpoint. Molecular melt at 150° C. is a liquid of low viscosity (lower than 10 Pa·s) and in addition it melts at temperatures of 97 to 105° C., before PP. Therefore, the need to disperse amounts of up to 30% in the masterbatch is a technological challenge. In terms of dispersion technology, dispersion in a PP of high fluidity (IF of 100 g/10 min, for example) would be obvious and commonly commercially available with other additives and compounds. However, with the results shown herein due to the serious limitation of temperature (lower than 180° C.), reaching elevated BSA dispersion within a polypropylene of low IF with no flow instability caused by the polymer is really something differentiated. Thus, in addition to the gains demonstrated by using masterbatch in relation to the powder, a suitable choice of process and activation sequence, there is also the choice of the masterbatch carrier, which allows for the enhancement of extensional properties, without increasing IF or apparent viscosity of the resin. The explanation for this effect occurs through kinematics of the PP dispersion of the masterbatch in PP matrix. The residence time in an extruder may vary, but industrially, i.e. in industrial plant, it is about 30 s. In this process, PP matrix and masterbatch tend to melt, but because PP matrix has a lower grain size it has a higher contact area and will preferentially melt. In a determined initial step of heating, the molecules that surround the BSA-dispersed particles will be those of the masterbatch carrier. Statistically speaking, when temperatures of 190° C. are reached, wherein both are melted, there will be a tendency between PP matrix and PP carrier of the masterbatch to mix together, but some of azide groups of the sulphonazide will already have energy to react and will react with the molecules of the masterbatch carrier such that the second group contacts with the PP molecules of the matrix to permit coupling of these molecules. Thus, the higher the Mw of the PP carrier, the higher the molar mass of the molecule of branched PP, with longer branches and consequently acting more intensively on the alteration of the rheological properties of the polymers. By means of this control, it is expected that with this optimization, a total lower number of branches is required to achieve a resin suitable for determined processes, in comparison with the products described in irradiation processes and other reactive extrusions as described in Table 2.

After having been disclosed an example of a preferred embodiment, it should be understood that the scope of the present invention contemplates other variations, the invention being limited only by the contents of the appended claims, where the possible equivalents are included therein.

What is claimed is:

1. A process for the production of a modified polypropylene, characterized in that it comprises:
   (A) preparing a bis(sulfonazide) (BSA) masterbatch by dispersing BSA in polypropylene; and
   (B) adding (i) at least one fatty acid salt with a metal cation of valence $1^+$ to $3^+$, and (ii) the BSA masterbatch prepared in step (A) in the polypropylene to be modified;
   wherein steps (A) and (B) are carried out by extrusion.

2. The process in accordance with claim 1, wherein the extruder screw is selected from a single, double or planetary screw, interpenetrating or non-interpenetrating and counter-rotating or co-rotating screw.

3. The process in accordance with claim 2, characterized in that in step (A) the screw L/D is higher than 20 and in step (B) the extruder is selected from an industrial extruder having a diameter higher than 250 mm and L/D higher than 10, or the compounding extruder with a diameter of 20 to 250 mm and L/D higher than 25.

4. The process in accordance with claim 1, characterized in that the residence time of step (A) is lower than 40 s and residence time of step (B) is lower than 30 s.

5. The process in accordance with claim 1, characterized in that the extrusion temperature of step (A) is lower than 190° C., and the extrusion temperature of step (B) is lower than 270° C.

6. The process in accordance with claim 1, characterized in that steps (A) and (B) occur integrally or independently.

7. The process in accordance with claim 1, characterized in that BSA is selected from the group consisting of sulphonyl azides, poly(sulfonyl azides), phosphazene azides, poly(phosphazene azides), silyl azides, poly(silyl azides), formyl azides, poly(formyl azides), azides, poly(azides), N-chlorosulfonamides salts, N,N-dichlorosulfonamides, inner salts of 2-trialkyl-1-sulfonylhydrazides, diazo alkanes, poly(diazo alkanes), geminally-substituted methylene groups, ketenes, metallocarbenes, and mixtures thereof.

8. The process in accordance with claim 1, characterized in that BSA is 4,4'-diphenyl ether bis(sulphonazide).

9. The process in accordance with claim 1, characterized in that BSA is in a liquid, suspension and solid form, in physical mixtures with polymers and/or in molecular melt form.

10. The process in accordance with claim 1, characterized in that in step (A) the amount of BSA in the masterbatch is lower than 7.5%.

11. The process in accordance with claim 1, characterized in that the amount of molecular melt in the masterbatch is between 5% and 35% in the masterbatch composition.

12. The process in accordance with claim 1, characterized in that the amount of BSA in the modified polypropylene ranges from 200 to 2000 ppm.

13. The process in accordance with claim 1, characterized in that the polypropylene of step (A) is a polypropylene selected from the group consisting of homopolymers, copolymers, heterophasic copolymer/homopolymer matric (HECO) of random propylene/alpha-olefin heterophasic copolymer matrix (RAHECO) and/or random copolymer (RACO) comprising propylene/ethylene and/or α-olefin containing from 4 to 10 carbon atoms.

14. The process in accordance with claim 13, characterized in that IF of the polypropylene ranges from 1 to 300 g/min.

15. The process in accordance with claim 1, characterized in that the polypropylene to be modified in step B is selected from the group consisting of homopolymers, copolymers, heterophasic copolymer/homopolymer matric (HECO) of random propylene/alpha-olefin heterophasic copolymer matrix (RAHECO) and/or random copolymer (RACO) comprising propylene/ethylene and/or α-olefin containing from 4 to 10 carbon atoms.

16. The process in accordance with claim 15, characterized in that IF of the polypropylene to be modified ranges from 1 to 300 g/min.

17. The process in accordance with claim 1, characterized in that the polypropylene to be modified is step B is in the form of a pellet, spheres, powder and/or mixtures thereof.

18. The process in accordance with claim 1, characterized in that additives selected from the group consisting of nucleants, flame retardants, pigments, anti-UV agents, COF controllers, mold-release agents, IR-absorption agents, demolding auxiliaries, anti-static agents, and mixtures thereof are optionally added in steps (A) and/or (B).

19. The process in accordance with claim 1, characterized in that antioxidants selected from the group consisting of phenolic antioxidants, phosphates, phosphites, and mixtures thereof are optionally added in steps (A) and/or (B).

20. The process in accordance with claim 1, characterized in that compatibilizers or fatty acid salts with metal cations having valence of $1^+$ to $3^+$ are optionally added in step (A).

21. The process in accordance with claim 1, characterized in that the fatty acid salts are stearates and the metal cation is selected from Ca, Zn, Mg, Na, Li and Ba.

22. The process in accordance with claim 1, characterized in that in step (B) the fatty acid salts are added in an amount ranging from 200 to 6000 ppm based on the total mass of modified polypropylene.

23. The process in accordance with claim 1, characterized in that the masterbatch has a reduction of domains of BSA and/or molecular melt for median values lower than 50 mm.

24. Modified polypropylene produced by the process as defined in claim 1, characterized in that it has g' lower than 1, $B_n$ greater than 0.1 and IF lower than 100 g/10 min.

25. Modified polypropylene, in accordance with claim 24, characterized in that it has g' superior to 0.55 and $B_n$ lower than 4 atoms per 1000 carbon atoms.

26. Modified polypropylene, in accordance with claim 24, characterized in that it has a melt strength higher than 30 cN, extensibility higher than 11 cm/s, activation energy lower than 120 kJ/mol, g' lower than 0.75, $B_n$ higher than 2 carbon atoms per every 1000 atoms and IF between 2 and 6 g/10 min.

27. Modified polypropylene, in accordance with claim 24, characterized in that it has an amount of residues lower than 6 ppm.

28. Use of the modified polypropylene, as defined in claim 24, characterized in that it is for application in foaming, thermoforming, injection, blown films, flat films, BOPP, injection, fibers, raffia, recoating, and blowing.

29. Polymer blend comprising the modified polypropylene, as defined in claim 24, characterized in that it comprises at least one polymer selected from linear PP homopolymer, random and heterophasic copolymers, HDPE, LDPE, LLDPE, EVA, copolymer of ethene/octene, ethene/butane, ethene hexene, EPR thermoplastic rubbers, and mixtures thereof.

30. Polymer blend, in accordance with claim 29, characterized in that the modified polypropylene is present in amounts ranging from 5% to 95%.

* * * * *